US011988272B2

United States Patent
Hitpass et al.

(10) Patent No.: US 11,988,272 B2
(45) Date of Patent: May 21, 2024

(54) TRANSMISSION DEVICE WITH A FLOATING BUSHING FOR SUPPLY MEDIA BETWEEN COMPONENTS OF A PLANETARY TRANSMISSION

(71) Applicant: Flender GmbH, Bocholt (DE)

(72) Inventors: Florian Hitpass, Bocholt (DE); Carolin Telaar, Bocholt (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/272,018

(22) PCT Filed: Mar. 8, 2022

(86) PCT No.: PCT/EP2022/055821
§ 371 (c)(1),
(2) Date: Jul. 12, 2023

(87) PCT Pub. No.: WO2022/189398
PCT Pub. Date: Sep. 15, 2022

(65) Prior Publication Data
US 2024/0035560 A1    Feb. 1, 2024

(30) Foreign Application Priority Data

Mar. 9, 2021 (EP) .................................... 21161428

(51) Int. Cl.
*F16H 57/04*    (2010.01)
*F16H 57/08*    (2006.01)

(52) U.S. Cl.
CPC ..... *F16H 57/0431* (2013.01); *F16H 57/0479* (2013.01); *F16H 57/0486* (2013.01); *F16H 57/08* (2013.01)

(58) Field of Classification Search
CPC ............. F16H 57/0431; F16H 57/0479; F16H 57/0486; F16H 57/08
(Continued)

(56) References Cited

U.S. PATENT DOCUMENTS 3,603,213 A * 9/1971 Tootle .................... F16C 29/02
                                                    92/153
4,451,964 A * 6/1984 Ludwig .................... F16F 9/02
                                                    29/520
(Continued)

FOREIGN PATENT DOCUMENTS

CN    101338812        7/2008
CN    107435565 A     12/2017
(Continued)

OTHER PUBLICATIONS

International Search Report dated Oct. 8, 2023 by the Chinese Patent Office in Chinese Patent Application 202280007835.2.
(Continued)

*Primary Examiner* — Colby M Hansen
(74) *Attorney, Agent, or Firm* — Henry M. Feiereisen LLC (57) ABSTRACT

A planetary transmission includes a transfer device for transferring a supply medium. First and second transmission parts rotate relative to one another, with the transfer device having an annular groove on a surface of the first transmission part or of the second transmission part. The transfer device has bores distributed over a periphery. The first transmission part includes a separate bush which points towards the second transmission part and has a sealing groove with a sealing ring axially on both sides of the annular groove. The bush is arranged rotationally fixed on a rest of the first transmission part and designed to float in an axial direction with sufficient play in order to tilt out of a coaxial relative position with respect to the first transmission part and/or to the second transmission part to the extent of a relative movability of the respective sealing ring within the associated sealing groove.

12 Claims, 4 Drawing Sheets

(58) Field of Classification Search
USPC .......................................................... 475/159
See application file for complete search history.

(56) References Cited

U.S. PATENT DOCUMENTS

| | | | | |
|---|---|---|---|---|
| 4,552,368 A * | 11/1985 | Wallace | .................. | F16J 15/164 |
| | | | | 277/390 |
| 10,808,828 B2 | 10/2020 | Yoshitomi et al. | | |
| 2004/0188181 A1 | 9/2004 | Hori et al. | | |
| 2010/0202871 A1 * | 8/2010 | Bech | .......................... | F16H 1/48 |
| | | | | 475/331 |
| 2010/0202885 A1 * | 8/2010 | Demtroder | ............ | F16H 57/082 |
| | | | | 475/331 |
| 2010/0303626 A1 * | 12/2010 | Mostafi | .................. | F16H 1/2827 |
| | | | | 416/170 R |
| 2011/0133470 A1 * | 6/2011 | Winn | ....................... | F03D 15/20 |
| | | | | 310/78 |
| 2013/0217535 A1 * | 8/2013 | Suzuki | .................... | F03D 80/70 |
| | | | | 475/331 |
| 2014/0203561 A1 * | 7/2014 | Minadeo | .................. | F03D 9/255 |
| | | | | 290/44 |
| 2018/0216722 A1 | 8/2018 | Yoshitomi et al. | | |

FOREIGN PATENT DOCUMENTS

| | | |
|---|---|---|
| DE | 10260132 | 7/2004 |
| DE | 102010043816 | 5/2012 |
| DE | 102011118832 | 5/2013 |
| EP | 3056763 | 1/2016 |
| EP | 3042105 | 12/2017 |
| WO | WO 2017/032558 A1 | 5/2013 |

OTHER PUBLICATIONS

Translation of International Search Report dated Oct. 8, 2023 by the Chinese Patent Office in Chinese Patent Application 202280007835.2.

International Search Report dated Jul. 5, 2023 by the European Patent Office in International Application PCT/EP2022/055821.

* cited by examiner

TRANSMISSION DEVICE WITH A FLOATING BUSHING FOR SUPPLY MEDIA BETWEEN COMPONENTS OF A PLANETARY TRANSMISSION

CROSS-REFERENCES TO RELATED APPLICATIONS

This application is the U.S. National Stage of International Application No. PCT/EP2022/055821, filed Mar. 8, 2022, which designated the United States and has been published as International Publication No. WO 2022/189398 A1 and which claims the priority of European Patent Application, Serial No. 21161428.4, filed Mar. 9, 2021, pursuant to 35 U.S.C. 119(a)-(d).

BACKGROUND OF THE INVENTION

The invention relates to a planetary transmission having a transfer device for transferring a supply medium. The invention also relates to a drive train comprising an electric machine and such a planetary transmission. The invention also relates to a wind turbine having such a planetary transmission or such a drive train.

In transmissions, distribution of lubricant and/or distribution of coolant inside the transmission is at present not possible from a certain radial and axial relative movement between fixed and rotating components or rotating components. Due to the transmissions which now have a very compact construction with a high power density, particularly in the case of planetary transmissions with more than two planetary stages, there is only a limited installation space available for this distribution. Lubricant and coolant are generally also referred to as supply media.

The known systems for distributing supply media such as the double pitch tube system cannot be used in planetary transmissions on account of their heavy dependence on the sun inner diameter and the modern embodiment of transmissions in the form of a hybrid drive with a directly connected generator.

In addition, a requirement placed on the distribution of supply media within a transmission is that this distribution be embodied to be as low-leakage as possible.

DE 10 2010 043 816 A1 has disclosed a transmission having a lubricant guide comprising a lubricant bore which is introduced in a transmission housing and which opens out into an annular groove provided on an outer side of a relatively rotatable hollow shaft of an output stage. The annular groove is formed in an axial direction between two sealing rings which are inserted in a respective sealing groove of the hollow shaft and is sealed in the axial direction. A plurality of bores run from the annular groove to an inner side of the hollow shaft, a co-rotating lubricating duct carrier being positioned sealingly on the inner side of the hollow shaft. An annular gap is formed between the inner side of the hollow shaft and the lubricating duct carrier so that the lubricant can be guided to an input-side drive stage of the transmission, said drive stage being axially offset with respect to the output stage.

The object on which the invention is based is to improve the transfer and distribution of supply media inside planetary transmissions.

SUMMARY OF THE INVENTION

The object is achieved by means of a planetary transmission as set forth hereinafter. Preferred configurations are specified in the dependent claims and the following description, which may in each case individually or in combination represent an aspect of the invention. If a feature is presented in combination with another feature, this serves only for simplified presentation of the invention and is in no way intended to mean that this feature cannot also be a refinement of the invention without the other feature.

One aspect of the invention relates to a planetary transmission having a transfer device for transferring a supply medium between a first transmission part of the planetary transmission and a second transmission part of the planetary transmission, wherein, during operation of the planetary transmission, the first transmission part and the second transmission part exhibit a rotational movement relative to one another and each at least partially form a part of the transfer device, wherein the transfer device comprises an annular groove on the surface of the first transmission part or on the surface of the second transmission part, wherein the transfer device comprises bores which are distributed around the periphery, wherein the bores distributed around the periphery are arranged opposite the annular groove, wherein the first transmission part comprises a separate bush for transferring the supply medium, said bush pointing toward the second transmission part, wherein a respective sealing groove is formed in the bush axially on both sides of the annular groove, wherein a respective sealing ring is arranged in the sealing grooves, wherein the bush is arranged in a rotationally fixed manner resting on the rest of the first transmission part, wherein the bush is configured in floating form in an axial direction with a sufficient amount of play to tilt out of a relative position which is coaxial with the first transmission part and/or with the second transmission part to the extent of a relative movability of the respective sealing ring within the associated sealing groove.

A further aspect of the invention relates to a drive train comprising an electric machine and such a planetary transmission, wherein a rotor of the electric machine is connected to a shaft of the planetary transmission in a force-fitting and/or form-fitting manner. A further aspect of the invention relates to a wind turbine having such a planetary transmission or such a drive train.

The invention is based, inter alia, on the finding that the distribution of a supply medium such as oil, which serves for lubrication and/or cooling inside a planetary transmission, can be improved by means of the proposed transfer device. This transfer device is arranged in the planetary transmission and extends over a first transmission part and a second transmission part which are arranged so as to be able to rotate relative to one another inside the planetary transmission. In this case, it is for example possible for said transmission parts to either be mounted on both sides or on one side or be arranged in a freely mounted embodiment. In particular, one of the transmission parts is fixed, that is to say of non-movable embodiment. By way of example, one of the transmission parts is in the form of a non-movably fixed transmission housing. The relative movement between the first transmission part and the second transmission part corresponds to a rotational movement. In a simple case, this may concern that part of a planetary transmission which is connected to the input shaft and the output shaft. In this case, it is for example possible for the input shaft to be connected to the planet carrier and the output shaft to be connected to the sun gear, while the ring gear forms a fixed component which is for example connected to the housing. Equally, it is possible and, as explained in more detail in one of the following paragraphs, particularly advantageous for the planetary transmission to be embodied with two stages or with even more stages, wherein the planet carriers of the respective stages each form at least a part of the first or second transmission part.

A factor common to all of these mentioned examples is that, during operation, the first transmission part and the second transmission part exhibit a movement relative to one another, corresponding to a rotational movement. Here, the first transmission part may be provided upstream of the second transmission part in the flow direction of the supply medium. As an alternative, the first transmission part may be provided downstream of the second transmission part in the flow direction of the supply medium. By means of the proposed transfer device, it is in this case possible to transfer a supply medium such as oil from the first transmission part to the second transmission part in a low-leakage manner. To this end, at least one annular groove is located on the one transmission part and extends around the transmission part. The annular groove is arranged at a location of the corresponding transmission part at which the first transmission part and the second transmission part radially overlap at least in certain portions. On the side of the other part, bores are then distributed around the periphery and are arranged aligned with the annular groove. Aligned in this context means that the bores lie above the annular groove and the supply medium can flow from the annular groove into the bores and vice versa. It is possible for there to be a slight offset of the bores and the annular groove relative to one another, provided that at least a part of the bore adjoins the annular groove in such a way that an exchange of the supply medium between the annular groove and the bores is possible in terms of flow.

On account of the spacings between the first transmission part and the second transmission part, a leakage rate of supply medium which instead of flowing between the annular groove and the bore makes use of the intermediate space between the first and the second transmission part to escape is to be expected. This escape is referred to as leakage.

In order to avoid or reduce the leakage, that is to say in order to embody the transfer device in a low-leakage manner, two or more sealing grooves are arranged on the first transmission part. The transmission part can in particular also comprise two, three or more sealing grooves in which a respective sealing ring can be arranged, wherein at least one sealing ring inserted in each case in an associated sealing groove on each side of the annular groove may already be sufficient. In this case, these are arranged on both sides of the annular groove. In this case, the annular groove may also be arranged on the first transmission part or alternatively on the second transmission part. The two sealing grooves in this case have an axial spacing to one another, wherein the annular groove, as viewed axially, is arranged between the two sealing grooves. Arranged in the sealing groove is a sealing ring which prevents the leakage considered above in that the sealing ring seals the volume flow of the supply medium in the region of the transition between the first transmission part and the second transmission part in a double-sided manner.

The proposed planetary transmission makes it possible to transfer lubricant/coolant from rotating systems to rotating systems and from fixed systems to rotating systems. In this case, the first and the second transmission part have different rotational speeds. In the case of a transfer from one rotating system to another rotating system, in the regular operating state of the planetary transmission, the rotational speeds of the first transmission part and of the second transmission part differ from zero and point in the same peripheral direction or in opposite peripheral directions. In the case of a transfer between a fixed system and a rotating system, the rotational speed of one of the transmission parts is zero, while the other transmission part has, in the regular operating state of the planetary transmission, a rotational speed which differs from zero. A particular advantage is that, in the case of small leakage volume flows, an axial and radial movability between the transmission parts can be compensated.

The interface between the first transmission part and the second transmission part may in this case be embodied parallel to the axis of rotation in the region of the transfer device. The transfer of the supply medium is then effected radially. It is equally possible for the interface to assume any desired angle with respect to the axis of rotation. In addition, it is also possible for the contour between the two sealing grooves to have a jump or a step, such that the transfer of the supply medium not only has a radial component but also an axial component. With a step, a purely axial transfer of the supply medium is also possible.

In comparison with previous solutions which provided for the use of a double pitch tube system, the solution proposed here is possible even in the case of different configurations of the sun inner diameter. In addition, the proposed planetary transmission is also suitable for use in a hybrid drive, in which the generator, or generally an electric machine, is arranged directly on the planetary transmission.

The proposed planetary transmission then offers the possibility of transporting the lubricant/coolant from the final planetary stage, for example a third planetary stage, to upstream planetary stages, for example a second planetary stage, and to the planetary stages upstream thereof, for example a first planetary stage. This possibility also makes it possible to transfer lubricant/coolant in a low-leakage manner in the case of high radial and axial relative movements of the individual transmission parts. The mentioned relative movements may be caused by the following measures which ensure that the sun is able to find the position thereof within the planetary stage:

cardanic coupling
release/omission of the planet carrier bearing
elasticities in the system
elasticities of the sun based on the design thereof.

The transfer of lubricant/coolant between the rotating transmission parts serves not only as an alternative solution to the double-walled pitch tube and to the transfer of lubricant/coolant by means of a labyrinth seal, but additionally exhibits a particularly high tightness owing to the low sealing gap diameter at the sealing elements. In this case, high axial and radial relative movements are made possible, which may be produced by the cardanic coupling, the release or omission of the planet carrier bearing, the elasticities in the system and the elasticity of the sun based on the design thereof. In this way, the proposed planetary transmission can also be used in a particularly advantageous and low-leakage manner under these operating conditions. In addition, an exchangeability on the tower is provided without the need to remove individual transmission stages. The proposed transfer system is particularly simple and has a low complexity due to the simple design and a low number of components. This enables reliable operation. The system design is particularly space-saving and thus also suitable in particular for transmissions with high power density. In particular, the configuration of the transmission with more than two stages is advantageous, since, in contrast to the double-walled pitch tube system, the sun of the last planetary stage can be guided very close to the pitch tube outer diameter, as a result of which the planetary stages can be embodied with a relatively great transmission ratio.

The proposed planetary transmission makes it possible to realize a high-performance drive train in a simple manner. In this case, the planetary transmission has a high power density. In other words, the proposed planetary transmission is particularly small for a predefined power output and meets the requirements of low installation space with a high power density. It can therefore also be coupled, in a hybrid drive, directly to an electric machine, in particular a generator. In this case, transmission and electric machine as drive train form a structural unit.

Owing to the compact design thereof and the low weight thereof, this structural unit or this drive train can particularly advantageously be used in a wind turbine. Due to the arrangement in the nacelle, a low weight affords a number of advantages in the construction of the tower and the nacelle of the wind turbine.

The bush may be embodied in floating form to the extent that the bush is able to move in the axial direction and/or in the radial direction relative to the first transmission part and/or to the second transmission part. The relative movability of the floating bush is determined and/or limited here substantially by the relative movability of the respective sealing ring in the associated sealing groove. The sealing ring may be fastened sealingly to the transmission part which differs from that transmission part which forms the associated sealing groove, such that the sealing ring performs a relative rotation in the sealing groove. The sealing groove has a greater axial extent than the sealing ring, for example by more than 20%, more than 50% or more than 100% of the axial extent of the sealing ring. Such an axial play of the sealing ring within the sealing groove enables a corresponding axial displaceability of the floating bush. In addition, a spacing may be formed in the radial direction between a base of the sealing groove and the inserted sealing ring, said spacing avoiding any grinding contact of the sealing ring on the base of the sealing groove. The spacing in the radial direction between the sealing ring and the base of the sealing groove may correspond, for example, to more than 5%, more than 20% or more than 50% of the material thickness of the sealing ring in the radial direction. The axial play of the sealing ring in the sealing groove and the radial spacing of the sealing ring to the base of the sealing groove makes it possible for the floating bush to be tilted out of a position which is coaxial with an axis of rotation. Under load and/or in the case of tolerance-induced misalignments, the bush may tilt to some extent out of the coaxial relative position, without the bush being clamped on the axial sides thereof between axial stops. Preferably, the bush is at least partially produced from a more ductile material than the rest of the first transmission part and/or the second transmission part, for example from a copper material or plastic. As a result, the bush can be tilted about a tilt axis running perpendicularly with respect to an axis of rotation of the first transmission part and/or of the second transmission part to the extent of the relative movability of the sealing rings in the associated sealing groove, as a result of which a low-leakage transfer of a supply medium between two transmission parts which are rotatable relative to one another but are not necessarily always centered exactly coaxially with respect to one another is made possible with simple structural means. In particular, it is possible to provide lower tolerance requirements for the production accuracy and position accuracy of the transmission parts, as a result of which the production costs can be reduced considerably.

The bores distributed around the periphery may be provided in the transmission part which is in each case opposite the annular groove. Here, the bush may comprise at least one opening, preferably a plurality of openings, in order to be able to exchange the supply medium between the rest of the first transmission part and the second transmission part. As an alternative, that part of the first transmission component which differs from the bush may comprise an annular groove which is open toward the second transmission component and toward the bush, wherein the second transmission component also has an annular groove which is open toward the first transmission component and/or toward the bush, wherein the bores distributed around the periphery are formed in the bush. The bush may be designed, for example, as a perforated cylinder, on the outer or inner lateral surface of which the sealing grooves for the sealing rings are provided. As a result, the bush is of particularly simple shape and can be produced in a cost-effective manner. In addition or as an alternative, the bush may comprise, at the radially outer end and/or at the radially inner end of the bores, an annular groove which connects the bores to one another in a peripheral direction. This makes it possible to save on an annular groove in the rest of the first transmission part or in the second transmission part.

The floating bush makes it possible for the sealing at the transition between the first transmission part and the second transmission part to be effected in a particularly low-wear manner. The floating bush creates a particularly narrow and thus low-leakage transition between the first transmission part and the second transmission part. In this region, no sealing is required. The sealing is effected between the floating bush and the remaining part of the first transmission part. This is also designed to compensate for axial displacements and tilting. On account of the dimensions and spacings required for this, the proposed sealing grooves and sealing rings are used in this region. Between the sealing rings and the components of the first transmission part there is no rotational relative movement that could result in wear of the sealing rings. In other words, due to the arrangement of the floating bush resting against the other parts of the first transmission part, a particularly low-wear operation of the planetary transmission is possible. Here, it is in principle possible for the floating bush to be coupled to the rest of the first transmission part in a rotationally fixed manner. When coupling the bush to the rest of the first transmission part, provision may be made of significant play in the peripheral direction and/or of only one single tangential stop. Since the direction of rotation of the first transmission part and of the second transmission part does not change, a single tangential abutment of the bush against the rest of the first transmission part is already sufficient to arrange the floating bush in a rotationally fixed manner resting on the rest of the first transmission part. Due to the play in the peripheral direction between the floating bush and the rest of the first transmission part, friction forces, which counteract tilting of the bush, between the floating bush and the rest of the first transmission part can be kept low. The intentionally permitted tilting of the floating bush is hardly affected by the low-wear reduction of the relative movement between the sealing rings and the first transmission part to approximately zero.

Provision is in particular made for a fixed transmission housing of the planetary transmission to form at least a part of the first transmission part, wherein a transmission component, in particular a planet carrier, which rotates relative to the transmission housing forms at least a part of the second transmission part. A conveying apparatus, for example an oil pump, can easily be connected to the fixed transmission housing in order to supply the supply medium, in particular lubricating oil. The transfer device can be used to convey the supply medium in an easy and low-leakage manner to a rotating transmission component, where the supply medium can reach locations to be lubricated, for example bearings or toothings, in particular in a manner at least partially driven by centrifugal force via radially outwardly leading openings. In addition, it is possible for a part of the mass flow conveyed to the rotating transmission component to be able to be conveyed via a further transfer device to a further relatively rotatable transmission component within the same transmission stage and/or an adjacent transmission stage.

In a further embodiment, provision is made for the first transmission part and the second transmission part to be embodied so as to be able to rotate relative to a fixed transmission housing of the planetary transmission. The transfer device may, as a result, also be provided for transferring the supply medium between two rotating transmission parts.

In an advantageous configuration of the invention, the first transmission part is arranged on the outside in relation to the second transmission part at least in the region of the transfer device, wherein the floating bush encloses a part of the second transmission part, wherein the sealing grooves are arranged on the inner side of the floating bush. The sealing rings sit on the second transmission part and rotate at the speed of the second transmission part. The sealing rings are thus configured so as to bear against the inside. A plastic lends itself as material for the sealing rings. Due to the pressure of the supply medium, for example of the oil, at the transition between the annular groove and the bores, the supply medium presses the sealing rings against the edge of the sealing groove in each case and thus seals the latter.

In order to be able to mount the sealing rings on the second transmission part, it is advantageous for the annular groove to be arranged in the first transmission part and for the bores distributed around the periphery to be arranged in the second transmission part.

The use of this embodiment is particularly advantageous in a multi-stage transmission. Here, a transfer device, which may be configured and refined as described above, can in turn be provided in the flow path of the supply medium between further transmission parts, which are rotatable relative to one another, of the subsequent transmission stages in the flow path. Sealing rings composed of plastic can be inserted between the inner diameter of the preceding stage and that of the subsequent stage of the multi-stage planetary transmission. The sealing rings are also referred to as buffer rings. For this, a centered bush may be inserted in particular at the long hub of the subsequent planet carrier, which forms the running surface of the buffer rings. As an alternative, the contour may also be realized over an extension of the long hub of the planet carrier. In the preceding planet carrier, the buffer rings are inserted into the anticipated sealing grooves. The contour of the grooves may also be mapped over an additional bush.

Between the bush and the track of the buffer rings, a gap may be selected which can compensate for the radial displacement and the tilting of the overall system in the connection. The system is advantageously configured such that axial displacements can also be compensated.

In addition, the depth of the sealing groove of the buffer ring may be selected so as to correspond to the gap in order to prevent incipient running in the groove base.

The sealing rings of the respective transfer device may be inserted in the form of piston rings, for example in accordance with DIN 34 118, DIN 34 110 or similar standards relating to piston rings, into the anticipated sealing grooves of the floating bush. Between the cylindrical abutment surface of the piston rings, this corresponding to he bore in the first part outside the floating bush, and the floating bush, a gap may be selected which can compensate for the radial displacement and the tilting of the overall system at the transition location.

The floating bush may be secured against rotation by a holding device, as a result of which the piston rings are not subjected to any relative rotational movement. Axially, the floating bush has a sufficient amount of play so that the tilting of the system can be permitted. The relative rotational movements between the systems take place at the bore of the floating bush and an internal annular structure. This contact location is embodied in accordance with a plain bearing and is supplied with a sufficient amount of oil by the inner annular structure on account of the function of the lubricant/coolant transfer. It is particularly advantageous in this configuration that the sealing rings, for example in the form of piston rings, and the sealing groove rest against one another. Thus, only a minor amount of friction and wear is produced on the sides of the piston rings. This arrangement is therefore particularly low-wear.

In addition, this configuration has the advantage that it offers a flexible choice of position of the transfer device within the planetary transmission. In addition, the wear-generating movements in the planetary transmission are separated, as a result of which the wear of the piston rings is reduced considerably.

In a further advantageous configuration of the invention, the first transmission part is arranged on the inside in relation to the second transmission part at least in the region of the transfer device, wherein the floating bush is enclosed by a part of the second transmission part, wherein the sealing grooves are arranged on the inner side of the floating bush. The sealing rings are arranged on the inner side of the second transmission part and rotate at the speed of the second transmission part. The sealing rings are thus configured so as to bear against the outside. For this, piston rings lend themselves as sealing rings. As an alternative, it is also possible to use sealing rings which bear against the outside and which are composed of plastic and alternative materials. Due to the pressure of the supply medium, for example of the oil, at the transition between the annular groove and the bores, the supply medium presses the sealing rings against the edge of the sealing groove in each case and thus seals the latter.

In order to be able to mount the sealing rings on the second transmission part, it is advantageous for the annular groove to be arranged in the first transmission part and for the bores distributed around the periphery to be arranged in the second transmission part.

The use of this embodiment is particularly advantageous in a multi-stage transmission. Piston rings, for example in accordance with DIN 34 118, DIN 34 110 or similar standards relating to piston rings, are inserted between the inner diameter of the preceding stage of the multi-stage transmission and that of the subsequent stage. For this, a centered bush may be inserted at the long hub of the subsequent planet carrier, in which the piston rings are inserted into the anticipated sealing grooves. As an alternative, the contour may also be realized over an extension of the long hub of the planet carrier. The preceding planet carrier forms the track of the piston rings, which may be provided in the planet carrier or via a bush.

Between the bush and the track of the piston rings, a gap may be selected which can compensate for the radial displacement and the tilting of the overall system in the connection. The system is advantageously configured such that axial displacements can also be compensated. In addition, the depth of the sealing groove of the piston ring may be selected so as to correspond to the gap in order to prevent incipient running of the piston ring in the groove base.

Piston rings are available for example in accordance with DIN 34 118, DIN 34 110 or similar standards relating to piston rings in diameter ranges of 10-1200 mm. The proposed transfer device can therefore be implemented in a planetary transmission in various sizes and thus in various power classes.

Here, due to the floating bush, the spacing between the first transmission part and the second transmission part is also so small that the leakage is sufficiently low at this transition even without a sealing groove and sealing ring. In this case, the floating bush is capable of compensating for displacements which could otherwise lead to a large spacing between the first transmission part and the second transmission part. Without sealing measures, these would result in an impermissible high degree of leakage. The floating bush compensates for these displacements in this case. The sealing by means of the sealing groove and the sealing ring is then effected inside the first transmission part. In this exemplary embodiment, the sealing ring bears against the inside and is arranged in the sealing groove of the floating bush. On account of the sealing rings bearing against the inside, the sealing rings may advantageously be realized by use of a plastic or alternative material.

In addition, the floating bush may, for example, comprise a further annular groove for the transfer of the supply medium between the floating bush and the remaining part of the first transmission part. Here, too, in the remaining part of the first transmission part, further bores are distributed around the periphery in an aligned manner, in order to ensure the low-leakage flow of the supply medium. Since the further annular groove is arranged on the inner side of the floating bush, the annular groove is arranged on the second transmission part and the bores distributed around the periphery are arranged on the second transmission part.

It is therefore advantageously also possible for the annular groove to be arranged on the inner side of the floating bush, between the sealing grooves.

The floating bush may be secured against rotation by a holding device, as a result of which the sealing rings are not subjected to any relative rotational movement. Axially, the floating bush has a sufficient amount of play so that the tilting of the system can be permitted. The relative rotational movements between the systems take place at the bore of the floating bush and a shaft which bears against the outside. This contact location is embodied in accordance with a plain bearing and is supplied with a sufficient amount of oil by the outer shaft on account of the function of the lubricant/coolant transfer.

It is particularly advantageous in this configuration that the sealing rings and the sealing groove rest against one another. Thus, only a minor amount of friction and wear is produced on the sides of the sealing rings. This arrangement is therefore particularly low-wear.

In a further advantageous configuration of the invention, the planetary transmission comprises a first transmission stage and a second transmission stage, wherein the planet carrier of the first transmission stage forms at least a part of the first transmission part, wherein the planet carrier of the second transmission stage forms at least a part of the second transmission part. In multi-stage transmissions, in particular multi-stage planetary transmissions, radial displacements and tilting of the individual transmission stages may occur. These have to be taken into account when configuring the supply medium distribution inside the transmission. The proposed planetary transmission can compensate for particularly great deviations between the transmission stages, without leakages in the supply medium circuit being produced. The proposed planetary transmission is therefore particularly suitable for the configuration as multi-stage transmission. It being very particularly suitable for the configuration with more than two stages.

In a further advantageous configuration of the invention, the first transmission part and the second transmission part are each at least partially formed by a cast part. Cast parts can be produced only with relatively great manufacturing tolerances, but are very stable and can transmit high forces and torques. By way of the proposed planetary transmission, even relatively great displacements and tilting can be compensated, such that the configuration of the transmission parts as cast parts makes it possible to produce a particularly high-performance planetary transmission. In addition, the supply with lubricants and coolants can be reliably ensured. This also has a positive effect on the power that can be transmitted by the planetary transmission. The configuration of the transmission parts as cast parts thus makes it possible to produce a particularly high-performance planetary transmission with the proposed transfer device with small dimensions and low weight.

BRIEF DESCRIPTION OF THE DRAWING

The invention will be described and explained in more detail below on the basis of the exemplary embodiments illustrated in the figures. It is shown in.

DETAILED DESCRIPTION OF PREFERRED EMBODIMENTS

Figure 1:
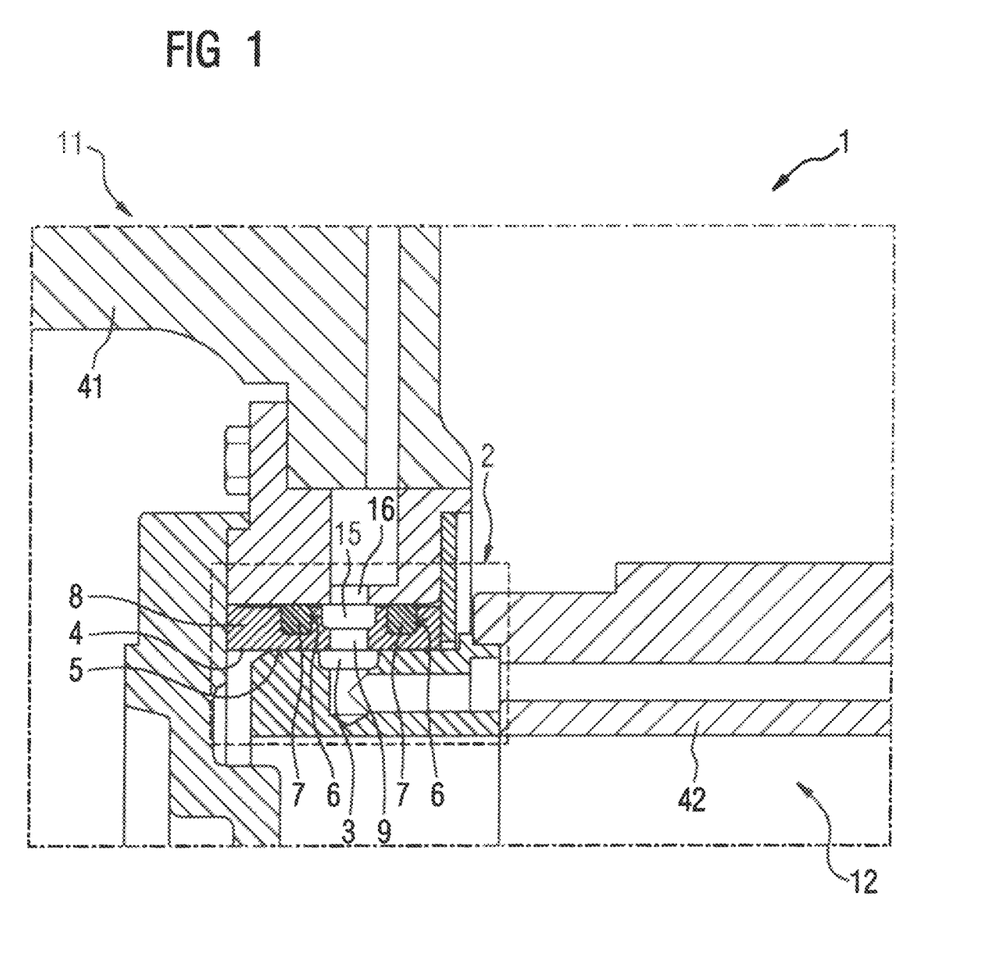
FIG. 1 and FIG. 2 configurations for a transfer device for supply media of a planetary transmission,
FIG. 3 a drive train, and
FIG. 4 a wind turbine.
Figure 2:
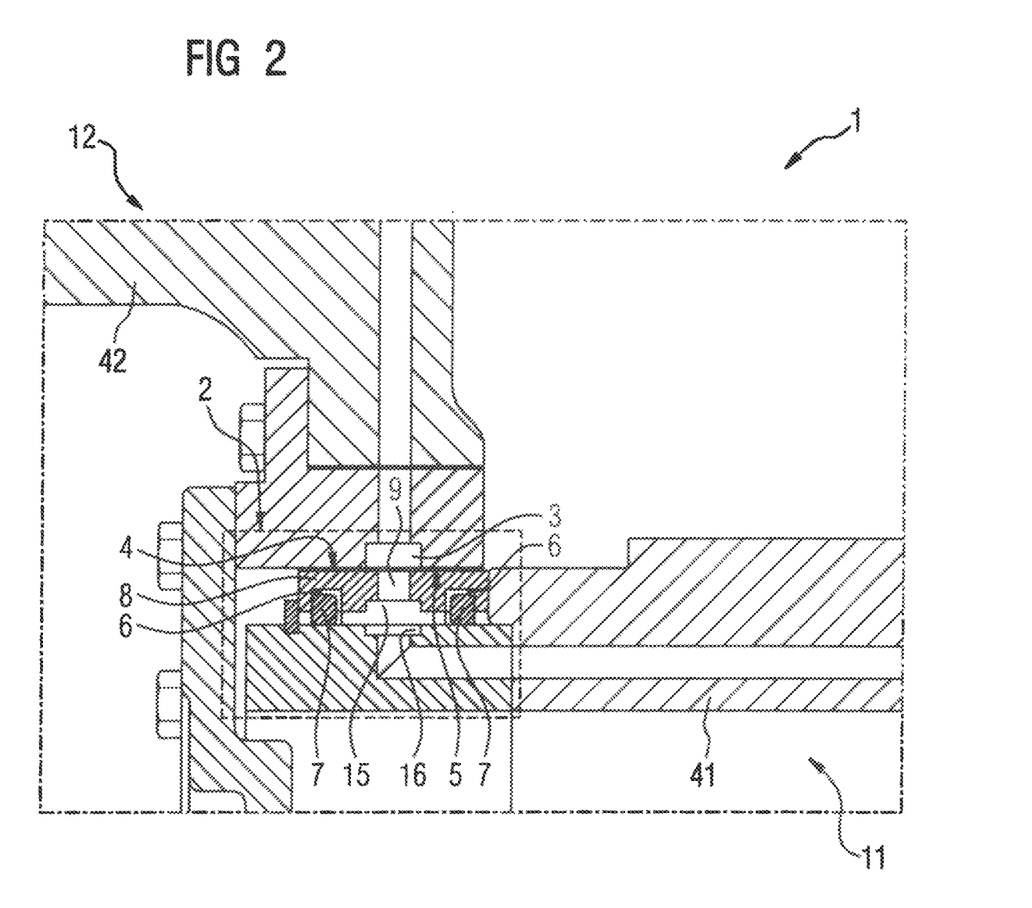

FIGS. 1 and 2 show different configurations of a transfer device 2 in a planetary transmission 1.

FIG. 1 shows a detail of the planetary transmission 1 in which the transfer device 2 is arranged. A plurality of transfer devices 2 may be arranged in a planetary transmission 1. The transfer device 2 is used to transfer a supply medium between a first transmission part 11 and a second transmission part 12. These two transmission parts 11, 12 are arranged in the planetary transmission 1 and exhibit a relative rotational speed with respect to one another during operation. In this case, the first transmission part 11, which represents the outer part in this exemplary embodiment, comprises a floating bush 8. As part of the first transmission part 11, the floating bush rotates at the speed of the first transmission part. Sealing grooves 6 are arranged on the outer side of the floating bush. Between the sealing grooves 6, bores 9, arranged radially offset and distributed around the periphery, are arranged on the inner side of the floating bush 8. In this case, the inner side of the floating bush 8 forms a surface 4 of the first transmission part 11. Located on the opposite side of the surface 4 of the first transmission part is a surface 5 of the second transmission part 12, which is arranged internally in relation to the first transmission part 11. In the second transmission part 12, an annular groove 3 is arranged on the surface 5 of the second transmission part 12, preferably so as to be aligned with the bores 9 distributed around the periphery. The sealing groove 6 is thus arranged on both sides, radially offset and axially spaced apart from the annular groove 3.

As an alternative, it is also possible for the annular groove 3 to be arranged in the first transmission part 11 and for the bores 9 distributed around the periphery to be arranged in the second transmission part 12.

Between the annular groove 3 and the bores 9, the supply medium can be exchanged between the first transmission part 11 and the second transmission part 12. Here, at the interface between the first transmission part 11 and the second transmission part 12, that is to say at the surface 4 of the first transmission part 11 and the surface 5 of the second transmission part 12, there is only a small spacing on account of the floating bush 8, said spacing reliably preventing leakage of the supply medium such as oil or at least limiting it to permissible values.

For various reasons such as a radial displacement or tilting, a spacing between the floating bush 8 and the other parts of the first transmission part 11 is produced within the first transmission part 11. The sealing groove 6 arranged in the first transmission part 11 is used in this regard. Arranged in the sealing groove 6 is a respective sealing ring 7 which bears against the floating bush 8.

In other words, the problem of the large spacing due to radial displacements and tilting is moved to a region within the first transmission part 11. The sealing is then also effected at the location where larger spacings are present, which cause an impermissibly high degree of leakage without sealing measures.

The annular groove 3, from which the supply medium can be transferred to the bores 9 distributed around the periphery, is present on the surface 5 of the second transmission part 12. In this case, the supply medium can be transferred in both directions. In this case, the bores 9 are arranged on the inner side in the floating bush 8 and preferably terminate in a further annular groove 15 on the outer side of the floating bush 8, it also being possible for the further annular groove 15 to be omitted. Further bores 16 are arranged distributed around the periphery on that part of the first transmission part 11 which lies opposite the floating bush 8, preferably so as to be aligned with the further annular groove 15, said further bores allowing an exchange of the supply medium within the first transmission part 11 even in the case of an increased spacing.

As an alternative, it is also possible for the further bores 16 distributed around the periphery to be arranged in the floating bush 8 and for the further annular groove 15 to be arranged in the remaining part of the first transmission part 11.

On both sides of the further annular groove 15, and thus also axially spaced apart from the annular groove 3, the sealing grooves 6 are arranged on the outer side of the floating bush 8. The sealing ring 7, which is arranged in the sealing groove 6, bears against that surface of the first transmission part 11 which lies opposite to the outer side of the floating bush 8. Again owing to the pressure of the supply medium at the transition between the further annular groove 15 and the further bores 16, said sealing ring is pressed against the edge of the sealing groove 6 and seals the latter. Since it is arranged so as to bear against the outside of the first transmission part 11, the sealing ring 7 may be in the form of a piston ring.

On account of the small relative movements, the sealing ring 7 is subjected at most to minor friction due to the contact with the edge of the sealing groove 6, since the first transmission part 11 and the floating bush 8, which represents a part of the first transmission part 11, exhibit no movement relative to one another. This arrangement is therefore particularly low-wear. Due to the low degree of wear, this configuration is suitable in particular for planetary transmissions 1 which are arranged in a wind turbine 30. Maintenance work there is often expensive since access to the wind turbine 30 is often difficult and thus laborious.

In the configuration of the planetary transmission 1 as a multi-stage transmission, a first planet carrier 41 of the first transmission stage may form the first transmission part 11 or a part of the first transmission part 11. Equally, a second planet carrier 42 of the second transmission stage may form the second transmission part 12 or a part of the second transmission part 12.

FIG. 2 shows a further exemplary embodiment of a planetary transmission 1. In this case, in contrast to the exemplary embodiment of FIG. 1, the first transmission part 11 is arranged on the inside in relation to the second transmission part 12. To avoid repetitions, reference is made to the description relating to FIG. 1, and also to the reference signs introduced there. Since the sealing grooves 6 are now located in the inner transmission part, the sealing ring 7 now bears against the inside. Due to the sealing ring 7 bearing against the inside, the material used for the sealing ring 7 may for example be a plastic. The transfer of the supply medium by means of the annular groove 3 and the bores 9 and the sealing by the sealing ring 7 in the sealing groove 6 is effected analogously to the descriptions of FIG. 1.

Figure 3:
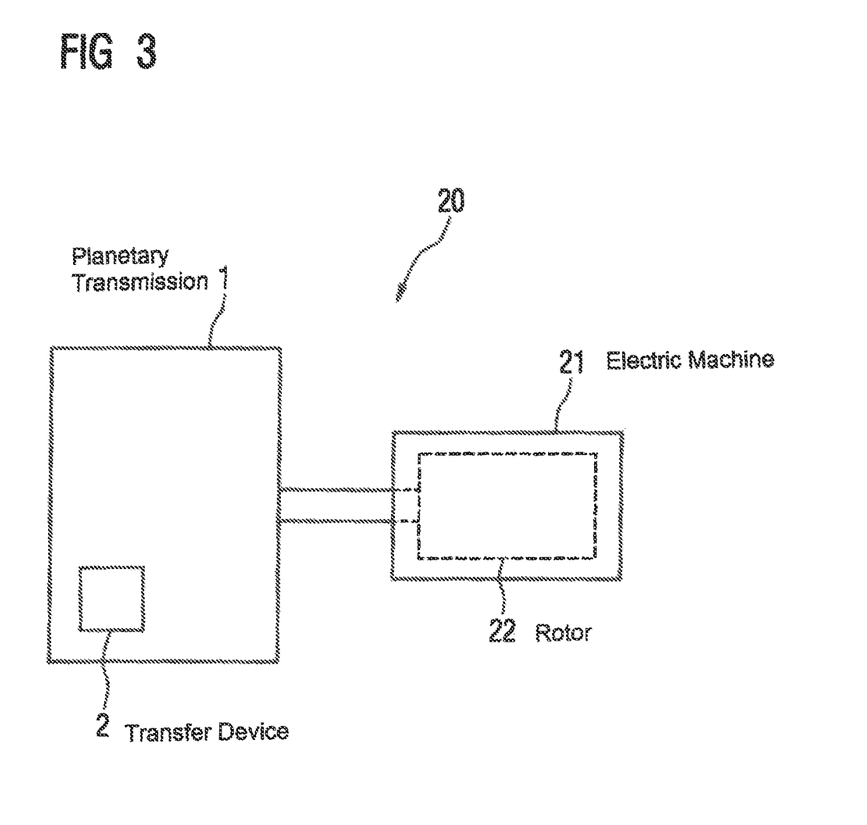
Figure 4:
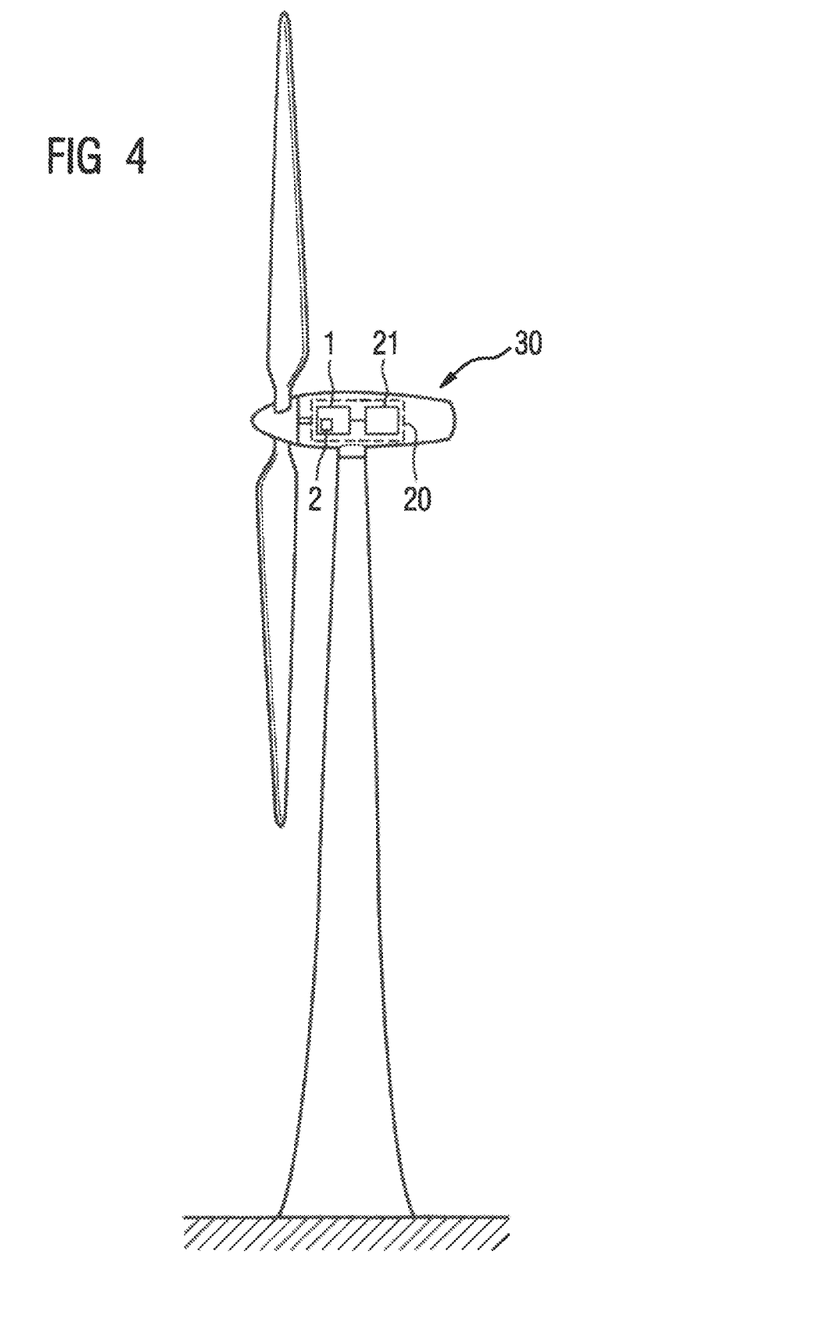

FIG. 3 shows a drive train 20. In the drive train 20, the planetary transmission 1 is coupled or connected to an electric machine 21. In this case, a rotor 22 is connected to a shaft of the planetary transmission 1. The planetary transmission 1 comprises a transfer device 2. Optionally, the electric machine 21 and the planetary transmission 1 may form a structural unit, what is referred to as a hybrid drive. On account of the advantages of the planetary transmission 1, it is possible to realize a particularly compact drive train 20. This has small dimensions and a low weight in relation to its performance. This drive train 20 or even only the planetary transmission 1 is therefore suitable for use in a wind turbine 30, as shown in FIG. 4. In this case, the electric machine 21 represents a wind power generator, that is to say a generator for a wind power application. Due to the low weight and the relatively small dimensions, an arrangement of the planetary transmission 1 or of the drive train 20 in a nacelle of the wind turbine 30 is advantageous, since this has a positive effect on the construction of the nacelle and of a tower of the wind turbine 30.

In summary, the invention relates to a planetary transmission having a transfer device for transferring a supply medium between a first transmission part of the planetary transmission and a second transmission part of the planetary transmission, wherein, during operation of the planetary transmission, the first transmission part and the second transmission part exhibit a movement relative to one another, wherein the transfer device comprises an annular groove on the surface of the first transmission part or on the surface of the second transmission part, wherein the transfer device comprises bores which are distributed around the periphery in the transmission part which is in each case opposite the annular groove, wherein the first transmission part comprises a floating bush, wherein the sealing grooves are arranged on the floating bush, wherein the floating bush is arranged on the first transmission part in such a way that the floating bush rests against the first transmission part, wherein in each case at least one sealing groove is arranged on the floating bush on both sides of the annular groove, wherein in each case at least one sealing ring is arranged in the sealing grooves. The invention also relates to a drive train comprising an electric machine and such a planetary transmission, wherein a rotor of the electric machine is connected to a shaft of the planetary transmission in a force-fitting and/or form-fitting manner. The invention also relates to a wind turbine having such a planetary transmission or such a drive train.

What is claimed is:

1. A planetary transmission, comprising:
    a first transmission part comprising a bush arranged such as to rest in a rotationally fixed manner on a rest of the first transmission part and comprising sealing grooves;
    a second transmission part, said bush of the first transmission part pointing toward the second transmission part for transferring a supply medium;
    a transfer device designed to transfer the supply medium between the first transmission part and the second transmission part, with the first and second transmission part each at least partially forming a part of the transfer device and with the first transmission part and the second transmission part exhibiting a rotational movement relative to one another during operation of the planetary transmission, said transfer device comprising an annular groove on a surface of the first transmission part or on a surface of the second transmission part, and bores distributed around a periphery such that the bores are arranged opposite the annular groove, with the sealing grooves formed in the bush axially on both skies of the annular groove; and
    sealing rings respectively arranged in the sealing grooves, wherein the bush is configured in floating form in an axial direction with a sufficient amount of play to tilt out of a relative position which is coaxial with the first transmission part and/or with the second transmission part to the extent of a relative movability of a respective one of the sealing rings within an associated one of the sealing grooves.

2. The planetary transmission of claim 1, wherein the first transmission part is arranged on an outside in relation to the second transmission part at least in a region of the transfer device, said bush designed to enclose a part of the second transmission part, with the sealing grooves of the bush being arranged on an outer side of the bush.

3. The planetary transmission of claim 1, wherein the first transmission part is arranged on an inside in relation to the second transmission part at least in a region of the transfer device, said bush being enclosed by a part of the second transmission part, with the sealing grooves being arranged on an inner side of the bush.

4. The planetary transmission of claim 1, further comprising:
    a first transmission stage comprising a planet carrier designed to form least a part of the first transmission part; and
    a second transmission stage comprising a planet carrier designed to form at least a part of the second transmission part.

5. The planetary transmission of claim 1, further comprising:
    a fixed transmission housing designed to form at least a part of the first transmission part; and
    a transmission component designed to rotate relative to the transmission housing and forming at least a part of the second transmission part.

6. The planetary transmission of claim 5, wherein the transmission component is a planet carrier.

7. The planetary transmission of claim 1, further comprising a fixed transmission housing, said first and second transmission parts being designed for rotation relative to the fixed transmission housing.

8. The planetary transmission of claim 1, wherein the first transmission part and the second transmission part are each at least partially formed by a cast part.

9. The planetary transmission of claim 1, wherein the bush has a ductility which is greater than a ductility of the rest of the first transmission part and/or the second transmission part.

10. The planetary transmission of claim 1, wherein the bores distributed around the periphery are formed in the bush.

11. A drive train, comprising:
    an electric machine comprising a rotor; and
    a planetary transmission as set forth in claim 1, said planetary transmission comprising a shaft, with the rotor of the electric machine being connected to the shaft in a force-fitting and/or form-fitting manner.

12. A wind turbine, comprising:
    a planetary transmission comprising a first transmission part comprising a bush arranged such as to rest in a rotationally fixed manner on a rest of the first transmission part and comprising sealing grooves, a second transmission part, said bush of the first transmission part pointing toward the second transmission part for transferring a supply medium, a transfer device designed to transfer the supply medium between the first transmission part and the second transmission part, with the first and second transmission part each at least partially forming a part of the transfer device and with the first transmission part and the second transmission part exhibiting a rotational movement relative to one another during operation of the planetary transmission, said transfer device comprising an annular groove on a surface of the first transmission part or on a surface of the second transmission part, and bores distributed around a periphery such that the bores are arranged opposite the annular groove, with the sealing grooves formed in the bush axially on both sides of the annular groove, and sealing rings respectively arranged in the sealing grooves, wherein the bush is configured in floating form in an axial direction with a sufficient amount of play to tilt out of a relative position which is coaxial with the first transmission part and/or with the second transmission part to the extent of a relative movability of a respective one of the sealing rings within an associated one of the sealing grooves; or
    a drive train comprising an electric machine with a rotor, and the planetary transmission, with the planetary transmission comprising a shaft, said rotor of the electric machine being connected to the shaft of the planetary transmission in a force-fitting and/or form fitting manner.

* * * * *

UNITED STATES PATENT AND TRADEMARK OFFICE
CERTIFICATE OF CORRECTION

PATENT NO. : 11,988,272 B2
APPLICATION NO. : 18/272018
DATED : May 21, 2024
INVENTOR(S) : Florian Hitpass et al.

It is certified that error appears in the above-identified patent and that said Letters Patent is hereby corrected as shown below:

In the Claims

In Column 13, Claim 1, Line 35 replace "skies" with --sides--.

Signed and Sealed this
Sixteenth Day of July, 2024

Katherine Kelly Vidal
*Director of the United States Patent and Trademark Office*